US008504395B2

(12) United States Patent  (10) Patent No.: US 8,504,395 B2
Vago et al.  (45) Date of Patent: Aug. 6, 2013

(54) SYSTEM FOR ACCEPTING VALUE FROM CLOSED GROUPS

(75) Inventors: Gabriel Vago, London (GB); Ran Granot, Yavne (IL); Carmi David Gressel, Kvutzat Urim (IL)

(73) Assignee: FortressGB Ltd., London (GB)

( * ) Notice: Subject to any disclaimer, the term of this patent is extended or adjusted under 35 U.S.C. 154(b) by 582 days.

(21) Appl. No.: 12/161,833

(22) PCT Filed: Jan. 28, 2007

(86) PCT No.: PCT/IL2007/000109
§ 371 (c)(1),
(2), (4) Date: Jul. 15, 2010

(87) PCT Pub. No.: WO2007/086068
PCT Pub. Date: Aug. 2, 2007

(65) Prior Publication Data
US 2010/0280945 A1  Nov. 4, 2010

Related U.S. Application Data

(60) Provisional application No. 60/762,899, filed on Jan. 30, 2006.

(51) Int. Cl.
*G06Q 40/00* (2012.01)
(52) U.S. Cl.
USPC ................................. 705/5; 705/44; 705/27
(58) Field of Classification Search
USPC ................................................ 705/5, 27, 44
See application file for complete search history.

(56) References Cited

U.S. PATENT DOCUMENTS 3,892,662 A 7/1975 Stout
4,742,215 A 5/1988 Daughters
(Continued)

FOREIGN PATENT DOCUMENTS

WO  00/22556 A1  4/2000
WO  WO00/22556  4/2000
WO  2005101977  11/2005
WO  2006030410  3/2006

OTHER PUBLICATIONS

International Search Report published on Dec. 22, 2005 for PCT/IL05/0431.

(Continued)

*Primary Examiner* — Siegfried E Chencinski
(74) *Attorney, Agent, or Firm* — Fleit Gibbons Gutman Bongini & Bianco PL; Paul D. Bianco; Martin Fleit (57) ABSTRACT

A system for facilitating a sequence of events and comprising a data bank loader operative to set up for each individual event by loading into an event attendee data bank, IDs and pre-paid balance values, for users expected to attend said individual event, a multiplicity of portable receptacles issued to known users and storing a user ID and a pre-paid balance value for a corresponding user, e-cash filling stations incrementing pre-paid balance values of users in an on-site data bank, and mobile service provider workstations reading portable receptacles, accessing the on-site data bank according to the user ID of each portable receptacle, entering into a transaction with a user if his pre-paid balance value accessed from the on-site data bank is positive, and decrementing the transaction's value from the user's pre-paid balance value in the on-site data bank.

22 Claims, 7 Drawing Sheets

U.S. PATENT DOCUMENTS

| | | | |
|---|---|---|---|
| 4,839,640 A | 6/1989 | Ozer et al. | |
| 5,056,141 A | 10/1991 | Dyke | |
| 5,204,663 A | 4/1993 | Lee | |
| 5,337,043 A | 8/1994 | Gokcebay | |
| 5,367,148 A | 11/1994 | Storch et al. | |
| 5,477,041 A | 12/1995 | Miron et al. | |
| 5,495,235 A | 2/1996 | Durinovic-Johri et al. | |
| 5,701,343 A | 12/1997 | Takashima et al. | |
| 5,953,504 A | 9/1999 | Sokal et al. | |
| 6,076,164 A | 6/2000 | Tanaka et al. | |
| 6,311,272 B1 | 10/2001 | Gressel | |
| 6,549,625 B1 | 4/2003 | Rautila et al. | |
| 6,609,114 B1 | 8/2003 | Gressel | |
| 6,937,998 B1* | 8/2005 | Swartz et al. | 705/27.1 |
| 6,999,936 B2* | 2/2006 | Sehr | 705/5 |
| 7,613,659 B1* | 11/2009 | Hoffman et al. | 705/44 |
| 2001/0018660 A1 | 8/2001 | Sehr | |
| 2002/0169666 A1 | 11/2002 | Ike | |
| 2003/0036980 A1* | 2/2003 | Wren | 705/27 |
| 2003/0046157 A1 | 3/2003 | Prorock | |
| 2004/0002305 A1 | 1/2004 | Byman-Kivivouri | |

OTHER PUBLICATIONS

International Search Report published on Jun. 1, 2006 for PCT/IL05/0424.

International Search Report mailed Jul. 7, 2008 for PCT/IL07/00109 filed Jan. 28, 2007.

Written Opinion mailed Jul. 7, 2008 for PCT/IL07/00109 filed Jan. 28, 2007.

International Search Report, Jul. 7, 2008.

Chip Card & Security ICs, Intelligent 1 Kybte Memory Chip with Interface for Contactless Transmission according to the Mifare System—Published by Infineon Technologies AG., May 2008 (6 Pgs).

* cited by examiner

SYSTEM FOR ACCEPTING VALUE FROM CLOSED GROUPS

REFERENCE TO COPENDING APPLICATIONS

This application is the U.S. National Stage Application of International Patent Application No. PCT/IL2007/000109, filed Jan. 28, 2007, which claims the benefit under 35 U.S.C. 119(e) of United States provisional patent application no. 60/762,899, filed Jan. 30, 2006.

Copending PCT Application No. PCT/IL 2005000431 describes the obtaining of multi-factor security using portable electronic devices; hereinafter "'431".

Copending PCT Application No. PCT/IL 2005000424 describes a system controlling paid access to, and payment schemes for, spectators in sports and other events, hereinafter "'424".

FIELD OF THE INVENTION

The present invention relates generally to computer controlled processes and systems for facilitating purchases.

BACKGROUND OF THE INVENTION

The following publications are believed to represent the state of the art:

U.S. Pat. No. 4,742,215 to Daughters, et al., hereinafter "215";

U.S. Pat. No. 6,609,114 to Gressel, et. al, hereinafter "114";

U.S. Pat. No. 6,311,272 to Gressel, et al; and

PCT/IL98/00497 to Tiecher et al describing a stored-value system handling isolated flow and circulation of electronic cash.

The disclosures of all publications mentioned in the specification, and of the publications cited therein directly or indirectly, are hereby incorporated by reference.

SUMMARY OF THE INVENTION

The present invention relates seeks to provide improved computer controlled processes and systems for facilitating purchases.

Sports events and other mass-attended gatherings generate significant difficulties due to the necessity of facilitating a large number of typically small commercial transactions, such as purchase of different types of edibles, between members of a huge population of typically mobile users and members of a large population of typically mobile service providers, typically of different types, within a small space and within a very short time period. Conventionally, purchases e.g. of edibles in stadiums are effected in cash, however, processing of cash purchases is sometimes slow and cash can be stolen by employees or purchasers, and can also cause altercations.

The present invention seeks to provide an improved computerized system for facilitating transactions under the above circumstances. It is a particular feature of a preferred embodiment of the present invention that the system takes prior advantage of previously known information regarding the huge population of anticipated users and performs a set-up process whereby the site, e.g. stadium, at which transactions occur is pre-loaded with relevant previous information, thereby to eliminate or reduce the need to contact external on-line computer facilities so as to prevent overload of the communication lines between the site and the external on-line computer facilities.

Another particular feature of a preferred embodiment of the present invention is that on-line updates regarding purchases, are provided within the closed group of service providers so as to facilitate a sequence of interactions between a particular user and a corresponding sequence of service providers, but, in order to make optimal use of existing computer resources, are typically not provided or not entirely provided, on-line, to parties outside the closed group of service providers.

Another particular feature of a preferred embodiment of the present invention is that systems for facilitating purchases provided herein preferably interact with one another so as to transmit balance value information, off line, between events, regarding a population of users which has been served by a first system at a first site and is expected to be served by a second system at a second site. For example, fans of a first, "away" team may be expected at a second site for an "away" match, and preparatory thereto, balance value data regarding the fans of the first team which is up to date, up until and including the match preceding the anticipated match at the second site, may be loaded into the purchase facilitation system at the second site.

Members of defined groups, typically sports clubs, have cherished membership cards which in reality are a commitment of loyalty to the group, and can be a useful equitable instrument for small and medium scale financial transactions; amenable for members of the group who do not posses credit cards or bank accounts, and convenient for members who have and use conventional electronic payment devices. Herein, similar benefits are preferably granted to non-members in possession of prepaid event tickets.

According to a preferred embodiment of the present invention, members of closed groups, aka Clubs, have cherished Membership Cards which in reality are a commitment of loyalty to the group, and can therefore be a useful low risk equitable instrument for small and medium scale financial transactions, e.g., purchase of food, product and/or services at Club events; amenable for Members of the Club who do not posses credit cards or bank accounts, and convenient for Members who have and use conventional electronic payment devices for medium and large value transactions. Herein, similar benefits are granted to non-members in possession of prepaid Event Tickets.

The present invention also seeks to provide, in accordance with a preferred embodiment thereof, a system of secure devices which cooperate among themselves to achieve a lower level of risk to users and system operators of using groups, hereinafter "Clubs", issuing Membership Cards to Members of the groups and issuing secured tickets to non members, hereinafter Aways, typically of the type described in the following document:

Chip Card & Security ICs, Mifare® NRG SLE 66R35, Short Product Information, May 2008, Infineon Technologies AG, hereinafter denoted as "Mifare".

The present invention also seeks to provide, in accordance with a preferred embodiment thereof, an improved, membership-based e-cash credit system.

Preferably, the system of the present invention generates enticements that entice "away" clubs and Club members to use the system to their and the Club's and Away Club's benefits.

Preferably, the system of the present invention is operative to credit Gift Vouchers, Vouchers, Rebate Voucher and Gift Certificates to individual e-accounts.

The system of the present invention also preferably establishes and maintains an equitable payment scheme for relatively small and medium sized purchases of goods and services, especially adapted to electronic crowd control systems using Membership Cards, prepaid Event Tickets, computerized networks and portable communication devices.

According to a preferred embodiment of the present invention, portable devices, such as mobile phones, secured memory controllers and Personal Digital Assistants (PDA's), integrated circuit Membership Cards, and secured Event Tickets having personal identifier attributes implemented based on smart card technology, are used in a heterogeneous population to enable transfer of value.

E-cash purchases of goods and services are typically executed at Club authorized points of sale. The Members and/or Aways identify themselves at the point of sale with their Membership Card and/or valid Event Ticket. Purchases are typically enabled after the point of sale has ascertained that the relevant e-cash account has been debited by an amount relevant to the effective purchase price, surcharges, discounts, etc. valid at the instant of the sale. Typically, negotiations are ratified on-line at the Club's central computer's data base.

Prepaid cards in the form of a receipt or a Scratch Card may be purchased at a kiosk and/or vending machine, where the user can preferably make payment either in cash or using his credit card, preferably by inserting his Membership Card to identify himself, in addition to the cash or credit card. If the kiosk is online and a suitable reading mechanism of the Member's Card is available, then the value may be credited directly to the Club-Member credit. Otherwise, the Club-Member can preferably credit an account by sending an SMS or by sending, via an information network such as the Internet, the printed number on the prepaid Scratch-Card or on the receipt.

The Club's central computer, e.g. the event attendee on-site data bank, preferably maintains the Club-Members lists, card numbers, accounts, and e-cash balances and data relevant to Event Tickets supplied to third parties, e.g., visiting clubs, and/or one-off attendees. The Club negotiates payment from third parties supplying credit to Aways and Members' e-cash accounts. The Club's central computer system may serve as the clearing mechanism for all transactions made within the Club system.

Each Member, bankable or unbankable, may be entitled to use his Membership Card in the same equitable way to make purchases of goods and services. The vending employee's terminal typically validates and confirms the state of the account and allowance to make the transaction, and typically prints a receipt for the Member and/or the Away and typically includes the balance in the e-cash account after the sale.

There is thus provided, in accordance with a preferred embodiment of the present invention, a system for facilitating a sequence of events, each event comprising a multiplicity of purchases made by a large, a priori known population, specific to that event, during a short, a priori known time interval at a known site, the population specific to an individual event comprising a multiplicity of a priori known users, the system comprising an on-site event attendee data bank recording an ID and a pre-paid balance value for each individual user within the known population of users expected to attend an individual event, a data bank loader operative to set up for each individual event by loading into the event attendee databank, IDs and pre-paid balance values, for users expected to attend the individual event, a multiplicity of portable receptacles issued to the multiplicity of known users respectively, each individual receptacle storing a user ID and a pre-paid balance value for a corresponding individual one of the known users, a first plurality of e-cash filling stations incrementing the pre-paid balance values of individual users in the on-site data bank, to reflect pre-payments made thereby, and a second plurality of mobile service provider workstations operative to read individual, ones of the multiplicity of portable receptacles, to access the on-site data bank according to the user ID of each individual portable receptacle, to enter into a transaction having a value with an individual user if the user's pre-paid balance value accessed from the on-site data bank is positive, and to decrement the transaction's value from the individual user's pre-paid balance value in the on-site data bank.

Further in accordance with a preferred embodiment of the present invention, at least some of the first plurality of e-cash filling stations are located at the site.

Still further in accordance with a preferred embodiment of the present invention, at least some of the e-cash filling stations are also operative to accept payment for entry to the site.

Additionally in accordance with a preferred embodiment of the present invention, the data bank loader comprises an ID and balance value data transfer interface operative to transmit the pre-paid balance value for each individual user within at least a subset of the known population of users to the data bank of a corresponding system at another site.

Further in accordance with a preferred embodiment of the present invention, the site comprises a sports arena and the data bank comprises a first section for home team data and a second section for away team data and wherein the balance data transfer interface is operative to transfer IDs and pre-paid balance values from the first section to corresponding systems before away games and to receive IDs and pre-paid balance values from corresponding systems and store these in the second section, before home games.

Further in accordance with a preferred embodiment of the present invention, the workstations comprise wireless workstations having a wireless data connection to the on-site data bank.

Also provided, in accordance with another preferred embodiment of the present invention, is a system for managing a consumer group comprising a multiplicity of consumers, the system comprising a multiplicity of membership cards borne by the multiplicity of consumers, wherein at least some of the multiplicity of membership cards includes a pre-paid payment scheme; and a membership managing functionality for interacting with the multiplicity of membership cards including functionality for managing the pre-paid payment scheme.

Further in accordance with a preferred embodiment of the present invention, each individual membership card comprises an electronic chip.

Also provided, in accordance with another preferred embodiment of the present invention, is an electronic members' purchasing system enabling a population of members to effect purchases, the system comprising a multiplicity of vouchers each bearing a unique voucher ID; a plurality of communication devices each including an interface for receiving the voucher IDs, the plurality of communication devices being respectively associated with a plurality of electronic accounts; a plurality of membership cards associated with the plurality of electronic accounts respectively; and a voucher management functionality operative to store a plurality of account balances corresponding to the plurality of electronic accounts, to receive a voucher ID from an individual one of the plurality of communication devices, to decrement the accounts to reflect sale information; and to provide account balance information upon presentation of a relevant membership card.

Further in accordance with a preferred embodiment of the present invention, at least some of the communication devices comprise mobile communication devices.

Still further in accordance with a preferred embodiment of the present invention, at least some of the communication devices comprise wireless communication devices.

Additionally in accordance with a preferred embodiment of the present invention, at least some of the communication devices comprise cellular communication devices.

Still further in accordance with a preferred embodiment of the present invention, at least some of the communication devices comprise SMS transmitting devices.

Additionally in accordance with a preferred embodiment of the present invention, at least some of the communication devices communicate via the Internet or via a WAN.

Still further in accordance with a preferred embodiment of the present invention, the ID-bearing vouchers comprise vouchers each having a human-sensible ID which may comprise a human-readable ID.

Further in accordance with a preferred embodiment of the present invention, the system also comprises an alert generator operative to query the data bank re users having an unused balance exceeding a specific value and to generate an alert, typically toward the end of the event, informing the users that a special service is now being offered at the specific value.

Also provided, in accordance with another preferred embodiment of the present invention, is a computer-controlled process for facilitating a sequence of events, each event comprising a multiplicity of purchases made by a large, a priori known population, specific to that event, during a short, a priori known time interval at a known site, the population specific to an individual event comprising a multiplicity of a priori known users, the system comprising at an on-site event attendee data bank, recording an ID and a pre-paid balance value for each individual user within the known population of users expected to attend an individual event; setting up for each individual event by loading into the event attendee databank, IDs and pre-paid balance values, for users expected to attend the individual event; issuing a multiplicity of portable receptacles to the multiplicity of known users respectively, each individual receptacle storing a user ID and a pre-paid balance value for a corresponding individual one of the known users; using a first plurality of e-cash filling stations to increment the pre-paid balance values of individual users in the on-site data bank, to reflect pre-payments made thereby; and at a second plurality of mobile service provider workstations operative to read individual ones of the multiplicity of portable receptacles, accessing the on-site data bank according to the user ID of each individual portable receptacle, to enter into a transaction having a value with an individual user if the user's pre-paid balance value accessed from the on-site data bank is positive, and to decrement the transaction's value from the individual user's pre-paid balance value in the on-site data bank.

According to a preferred embodiment of the present invention, value can be credited to an e-cash or loyalty scheme account by transferring a one-time-used-number obtained via Scratch Card or issued within a receipt at time of making a purchase and/or attending a venue or using of a service. The same can be employed for reloading and transferring value and or benefits to an e-cash and/or loyalty account.

According to another preferred embodiment of the present invention, the one-time-used-number obtained at a service point may be transferred automatically or manually to the electronic-managed-account e.g. via a cellular mobile phone's SMS or be sent via Internet or other available Wide Area Networks.

According to still another preferred embodiment of the present invention, forcing of the one-time-used-number, and attaching value to one-time used numbers within the scheme, is managed at the back-office management system where such numbers are generated, distributed, traced, and validated after claim; single use of numbers is enforced; and disputes are resolved if such arise.

Also provided, in accordance with still another preferred embodiment of the present invention, is a system for enabling extended crediting accounts of Members of a closed group to be used for at least small purchasing of group sponsored services, amusement, edibles or other produces, wherein each Member is provided with a portable electronic Membership identifying device whereby Members are enabled to obtain added value.

Any suitable processor, display and input means may be used to process, display and accept information as described herein, such as but not limited to a conventional personal computer processor; display screen and/or printer; and keyboard/mouse.

Workstations practicing the invention shown and describe herein may communicate via any conventional wired or wireless digital communication means, optionally via a communication network such as the World Wide Web.

BRIEF DESCRIPTION OF THE DRAWINGS

The invention is herein described, by way of example only, with reference to the accompanying drawings, wherein.

DETAILED DESCRIPTION OF A PREFERRED EMBODIMENT

Figure 1:
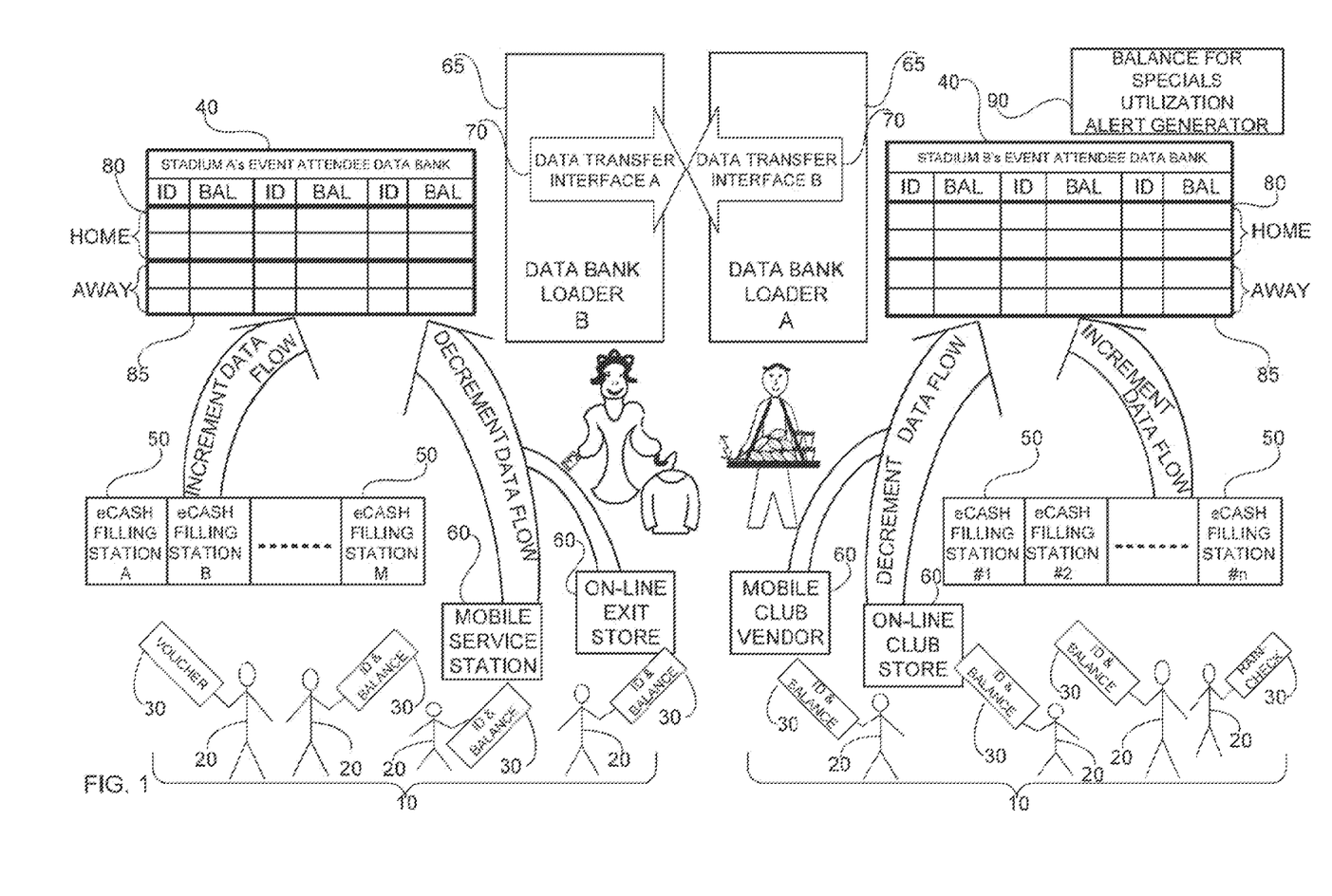
FIG. 1 is a simplified block diagram illustration of a system, constructed and operative in accordance with a preferred embodiment of the present invention, for facilitating a multiplicity of purchases made by a large, a priori known population during a short, a priori known time interval at a known site such as a sports arena, the population comprising a multiplicity of a priori known users who are about to attend an event such as a sports event.

Reference is made to FIG. 1 which is a simplified block diagram illustration of one or more typically interacting systems 10 for facilitating a multiplicity of purchases made by a large, a priori known population during a short, a priori known time interval at a known site such as a sports arena, the population comprising a multiplicity of a priori known users 20 who are about to attend an event such as a sports event. Each system 10 typically comprises a multiplicity of portable receptacles 30 issued to the multiplicity of known users 20 respectively, each individual receptacle 30 storing a user ID and a pre-paid balance value for a corresponding individual one of the known users 20. Each receptacle may comprise a membership card, ticket or voucher each preferably having a read-write non-volatile memory.

An on-site event attendee data bank 40 records a pre-paid balance value for each individual user within the known population of users who are about to attend the event. A first plurality of e-cash filling stations 50 increments the pre-paid balance values of individual users in the on-site data bank 40, to reflect pre-payments made by individual users.

A second plurality of typically mobile service provider workstations 60 are each preferably operative to read individual ones of the multiplicity of portable receptacles 30, to access the on-site data bank 40 according to the user ID of each individual portable receptacle 30, to enter into a transaction having a value with an individual user 20 if the user's pre-paid balance value accessed from the on-site data bank 40 is positive, and to decrement the transaction's value from the individual user's pre-paid balance value in the on-site data bank 40. Typically each workstation 60 comprises a wireless workstation having a wireless data connection to the on-site data bank 40. Typically each workstation 60 is capable of printing a paper receipt documenting each transaction.

At least some of the e-cash filling stations 50 are preferably located at the site. Some of the filling stations 50 may comprise ticket selling workstations which may or may not be located at the site.

The event attendee data bank 40 is loaded, before each event, by a data bank loader 65 operative to set up for each individual event by loading into the event attendee databank, IDs and pre-paid balance values, for users expected to attend the individual event, except insofar as such data is already present in the event attendee data bank e.g. because some or all of the event attendees whose data records are currently stored in the data bank, have not attended any events since the last event facilitated by the system 10.

The system of FIG. 1 also preferably comprises an ID and balance value data transfer interface 70 operative to transmit the pre-paid balance value for each individual user within at least a subset of the known population of users to the data bank 40 of a corresponding system at another site, typically via an information network such as the World Wide Web. In sports arena applications, each data bank 40 in each sports arena typically comprises a first section 80 for home team data and a second section 85 for away team data. The balance data transfer interface 70 of each system 10 is then typically operative to transfer IDs and pre-paid balance values from the first section 80 to corresponding systems 10 before away games and to receive IDs and pre-paid balance values from corresponding systems 10 for the data bank loader 65 to store in the second section 85, before home games. Typically, after team A plays an individual away game hosted by team B, the balance data transfer interface 70 of the away team A's system 10 requests a data update from the balance data transfer interface 60 of the hosting team's system 10.

Optionally, the system of FIG. 1 includes an alert generator 90 which generates an alert, typically toward the end of the event, informing users who have an unused balance exceeding a specific value, that a special service is now being offered at the specific value. For example, the alert generator might comprise an SMS sent to each such user.

Preferably, the ID and balance-storing portable receptacles 30 of the present invention comprise objects with emotional content for the bearers thereof, or objects perceived as having value or prestige, such that the bearers feel an emotional attachment to, and trust, the balance-storing receptacles. The psychological element of trust enhances the stability of the monetary system implemented herein. For example, the balance-storing portable receptacles 30 may comprise the user's team or club membership card.

Access to the sports arena or other site may be provided in accordance with the teachings of copending PCT Patent Application No. PCT IL 2005000424. Security for the transactions performed by the system of FIG. 1 may be provided by apparatus such as that described in U.S. Pat. No. 4,742,215 to Daughters, and U.S. Pat. No. 6,609,114 to Gressel et. al.

Typically, the system of FIG. 1 is operative to automatically communicate information regarding balances, special offers and other information to any of the following communication devices which may be borne by users: cellular telephones, mobile phones which may be equipped with NFC capabilities, wireless PDAs, and other wireless communication devices capable of sending data messages such as "SMS" messages. The use of the term "mobile phone" herein should be construed as possibly including any of the above. The use of the term "SMS" should be construed as possibly including any digital messages.

The term "NFC" (Near Field Communications) refers to close-distance (e.g., one or two centimeters between antennae of devices) wireless data communications between two mobile phones, between a mobile phone and a contactless smart card reader, and/or between a mobile phone and a contactless or contact smart card like device. Suitable NFC methods are shown and described in copending applications '431 and '424.

The present specification uses conventional sports venue language to define the group or "club", and to differentiate users' e-cash accounts, if the accounts have been established, as Members' e-cash accounts and Aways' e-cash accounts. Members own Membership Cards and typically identify themselves when executing e-cash purchases using Membership Cards, whereas Aways identify themselves with Event Tickets used to make purchases which may debit their temporary Event Ticket identifying e-cash account. Typically, a Member who has forgotten his Membership Card uses an Event Ticket to establish a one-time e-cash account. It is appreciated that the applicability of the present invention is not limited to facilitating purchases at sports events and is instead applicable to an extremely wide variety of applications in which, at intervals, a large closed group congregates for a short time and wishes to effect purchases of goods and/or services. A group is "closed" if the identity of its members is entirely or partially known in advance.

The system of FIG. 1 is particularly advantageous because of reduced danger of theft and lessened tension between unruly crowds and product and service vendors.

The portable receptacles 30 in the system of FIG. 1 may for example comprise SIM cards, smart cards, other contactless and contact integrated circuit devices, chip devices, magnetic stripe devices and image devices carrying distinct information. The portable receptacles 30 in the system of FIG. 1 may be integrated with Membership Cards, Away's Event Tickets, financial cards, and credit and debit smart cards.

Scratch Cards may comprise cardboard credit size multi-colored printed devices, with hidden data concealed by an opaque covering. The typically colored soft foam plastic covering is typically silk-screened over hidden data by a security printing establishment. The concealing covering can easily be scratched-off by the recipient of the Scratch Card, to reveal the hidden information. According to a preferred embodiment of the present invention, the hidden number typically defines a time constrained value, useful for a purchaser to enact pre-payment to a remote account.

Figure 2:
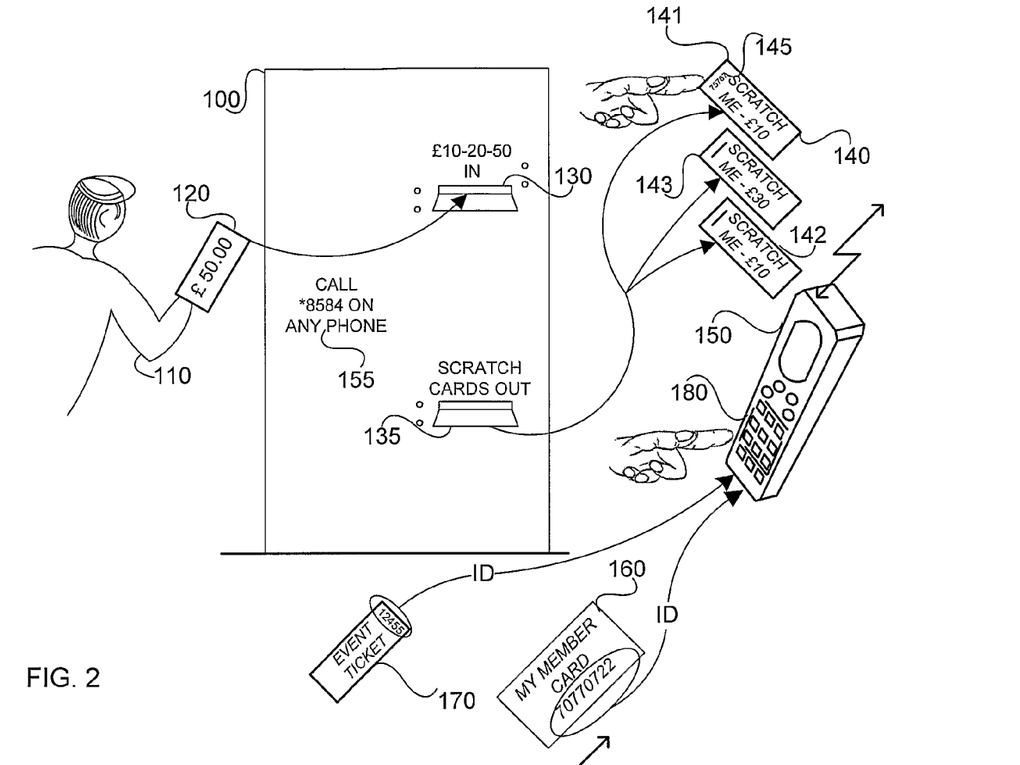
FIG. 2 is a simplified pictorial illustration of methods and apparatus, constructed and operative in accordance with a preferred embodiment of the present invention, for converting cash into credit in a Club e-cash account using Scratch-Cards, Cellular Telephones, with and without NFC technology and Event Tickets and Membership Cards as personal identifiers, operative to make purchases at Club authorized points of sale.

FIG. 2 illustrates a typical automated point of sale 100 wherein a Club Member 110 deposits cash value e.g. a £50.00 note 120 in the bill acceptor slot 130 which automatically (at slot 135) dispenses Scratch-Cards 141, 142, and 143. The Club Member may scratch the opaque coverings, as shown at 145, and reveal the unique numbers of each of the three Scratch Cards. The Member 110 may then, on his cellular phone 150, dial in a Club Clearance SMS number 155, e.g. *8584, and type in an SMS message, typically comprising a Member's identifying number residing on or in Membership Card 160 or Event Ticket 170, and the three unique Scratch-Card numbers. The Club clearance service credits the Member's e-cash account or the Event Ticket owner's temporary account accordingly. Typically, the Member is then enabled to identify himself with his Membership Card, and/or an Event Ticket, and/or his cellular phone 150 preferably comprises an NFC operative cellular phone with antenna. Preferably, the Member 110 receives an SMS which might for example inform as follows: "Thank you—you have added 10 Euro of e-cash to your account. Your balance is now 13.80 Euro. At game's end you may be entitled to buy any of the unique club specials available only at the exit store. Enjoy the match!"

Figure 3:
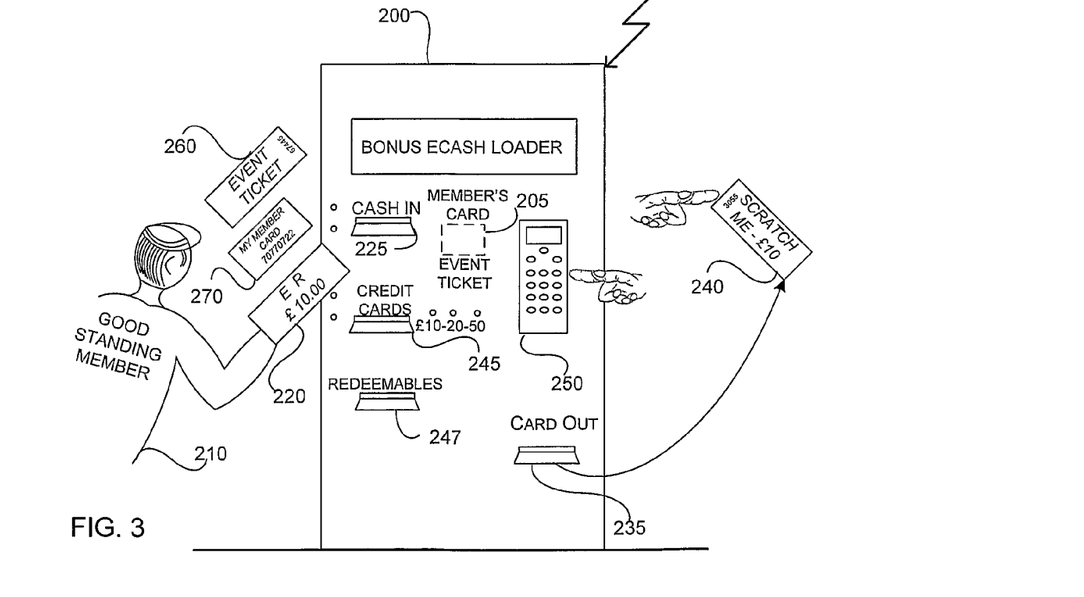
FIG. 3 is a simplified pictorial illustration demonstrating modes of transfer of credit to a Club Member's e-cash account at a Club authorized kiosk, operative in accordance with a preferred embodiment of the present invention.

FIG. 3 illustrates a multiplicity of options for transfer of value to a Club e-cash account in a networked terminal 200 provided in accordance with a preferred embodiment of the present invention. Typically, Members perform equivalent transfers of value over home Internet connections using prior art payment schemes. Optionally, the Member 210 or Away identifies himself to the Club system 10 by placing his contactless Event Ticket 260 and/or his Membership Card 270 over a Contactless Reader antenna. Member 210 deposits cash value e.g. a £10 note 220 in Cash Slot 225. Vending machine 200 dispenses Scratch-Card 240, via slot 235. Member 210 learns the unique Scratch Card number and, using telephone 250, dials in the unique number and optionally other details, via contactless reader 205. In apparatus 200, a Member is optionally allowed to transfer value using either a Club or conventional credit card in Card terminal 245. Typically, Member 210 designates the amount of value transfer and responds on dial device 250 with secret account ID numbers to safely verify conditions for transfer of value.

Figure 4:
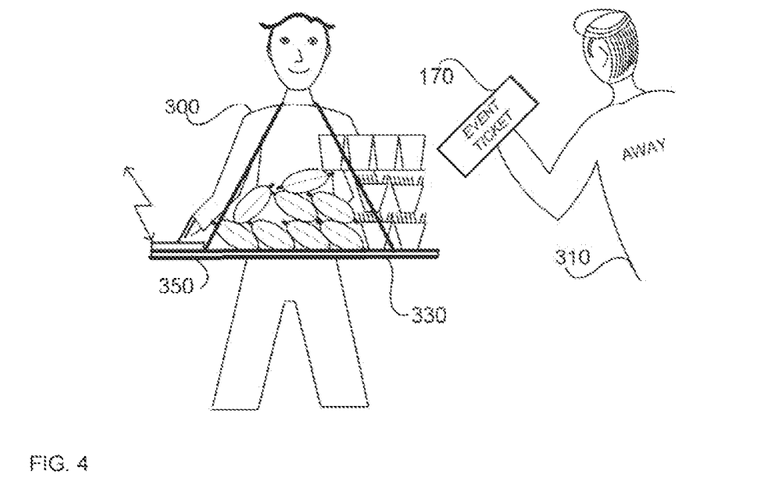
FIG. 4 is a simplified pictorial illustration illustrating use of a contactless Event Ticket identifier as a means for negotiating a sale of edibles at a Club event via a wireless PDA, in accordance with a preferred embodiment of the present invention.

FIG. 4 illustrates an e-cash purchasing process of product or services of an Away 310, using his Event Ticket 170, to purchase edibles, 330, from an authorized roaming Club vendor 300 according to a preferred embodiment of the invention. Club vendor 300 receives Event Ticket 170 from Away 310, keys in the Away's purchase request, and places Event Ticket 170 over, or in operative association with, a PDA wireless networked card reader 350. PDA 350 ascertains the Away's unique ticket number, receives approval from the Club's central computing system ascertaining that the system has debited the Away's temporary e-cash account, and thereby authorizes Club vendor 300 to complete purchase of goods, typically as described herein with reference to FIG. 1.

Figure 5:
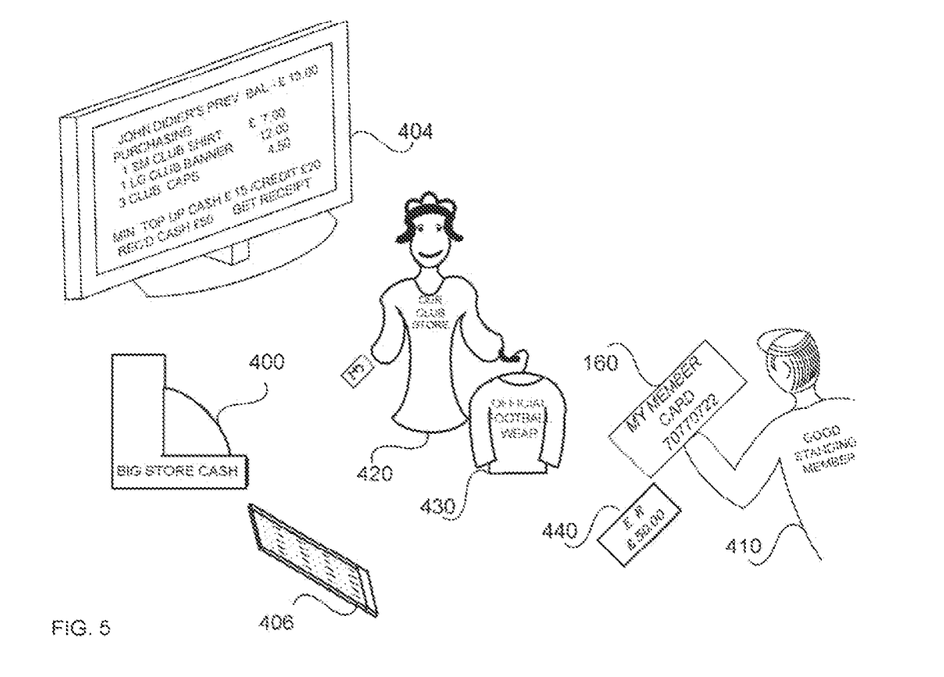
FIG. 5 is a pictorial illustration of a "hybrid" purchase of goods at a Club networked store operative to enable a Member to "top up" his e-cash account with sufficient cash to purchase a garment and to leave an e-cash surplus for future purchases of edibles, in accordance with a preferred embodiment of the present invention.

FIG. 5 illustrates a typical hybrid purchase, at a Club store, where goods' prices often exceed Club Members' credits in e-cash accounts. A cash register 400, a touch screen computer 404 and a keyboard 406 with a contactless card terminal interact to enable cash, credit card and e-cash transactions over the Club network. A Club Member 410 hands a store attendant 420 his Membership Card 160 and expresses a desire to purchase a garment 430. Store attendant 420 types in garment 430's serial number on keyboard 406 and places Membership Card 160 on the terminal reader of keyboard 406. The Club computer responds on monitor 404 that sufficient credit is available in the Member's e-cash account or responds with a notice of the minimum of value which Member 410 is to transfer to "top up" his e-cash account, in order to complete the sale. Member 410 hands over cash value e.g. a banknote 440. Store attendant 420 deposits banknote 440 in cash register 400 and hands over the garment, 430, and a receipt for the sale (not shown).

Figure 6:
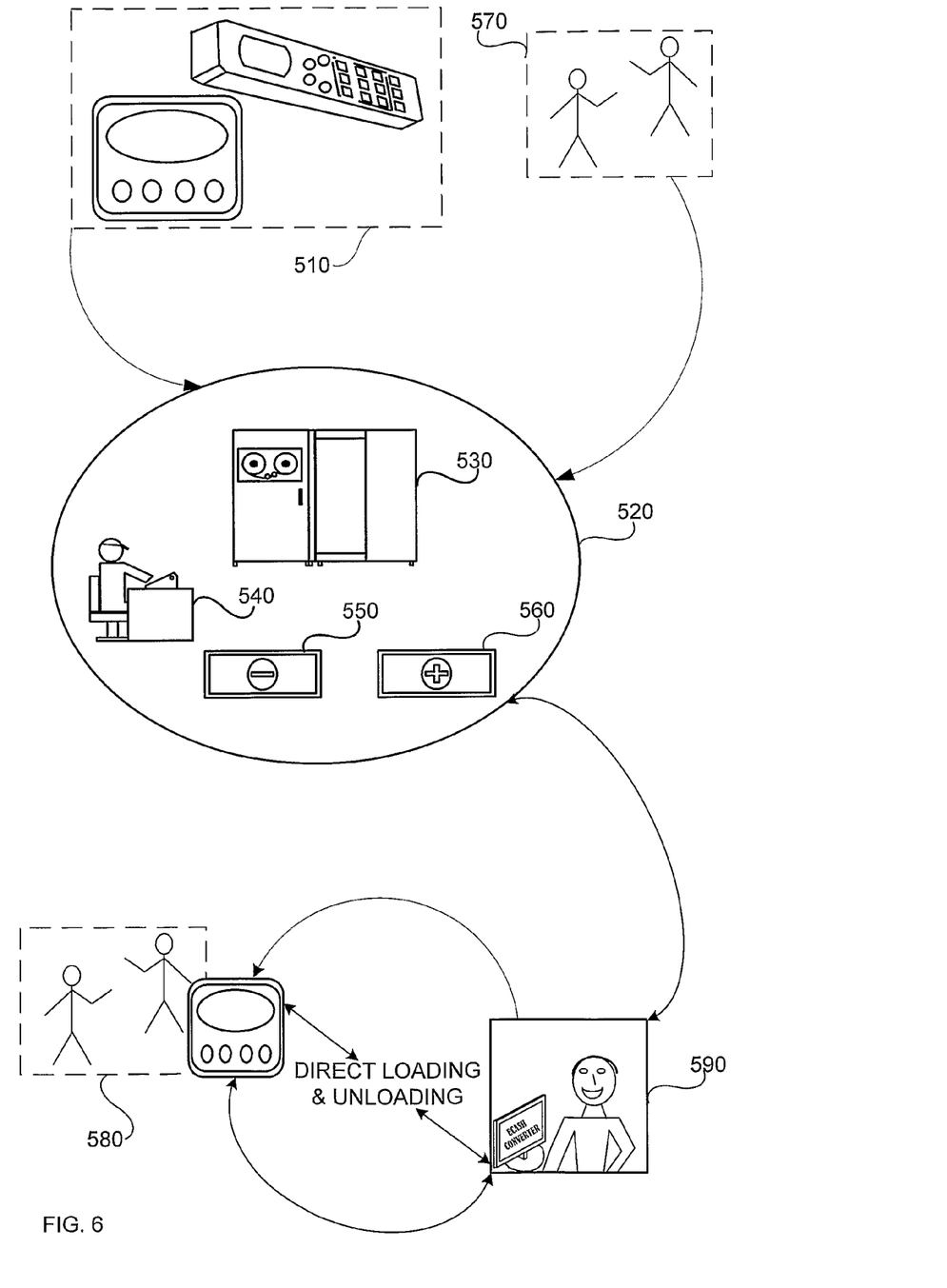
FIG. 6 is a simplified data flow diagram of an e-cash credit system suitable for managing interactions by a closed group, constructed and operative in accordance with a preferred embodiment of the present invention.

FIG. 6 is a simplified data flow diagram of an e-cash credit system suitable for managing interactions by a closed group, constructed and operative in accordance with a preferred embodiment of the present invention. The system of FIG. 6 is useful, inter alia, in implementing the embodiment of FIG. 1.

Typically, in order to eliminate or limit physical cash payments of spectators in Club sponsored events to Club authorized sales employees, a multiplicity of value transferring modes are provided, all operative to transfer value to Members' and Aways' e-cash Club accounts useful in such venues.

As shown in FIG. 6, a reloading-payment unit 510 typically loads and sends prepaid cash, coupons, vouchers or gift certificates, e.g. via SMS or via an information network such as the Internet, to a central unit 520. The central unit 520 preferably comprises a back office and clearing subunit 530, an accounting subunit 540, an accounts payable subunit 550 and an accounts receivable subunit 560. The central unit 520 may have a purchasing functionality which allows users 570 to purchase prepaid cards so as to pay for a service. The prepaid cards may be unloaded by unit 520 which is also operative to send a payment message to relevant units. Preferably, a multiplicity of club members 580 are served by a multiplicity of points of sale 590, which are operative to allow users to effect purchases, making payments with cash or credit for prepaid value. The points of sale 590 are also preferably operative to allow members 580 to purchase prepaid card certificates, voucher certificates and gift certificates. The point of sale 590 preferably provides report transactions to the central unit 520 and preferably receives therefrom, prepaid cards, certificates, voucher certificates and gift certificates.

Suitable Modes for incrementing Members' E-cash Accounts include one, some or all of the following modes:

a) A Member inserts an incremental amount of (physical) cash, e.g., $10, $20, $30, . . . €20, €30, . . . , or £10, £20, . . . in a computerized on-line Club operated kiosk, also termed herein "e-cash filling station 50", along with his Membership Card 30, to increment his Club sponsored e-cash account. The kiosk terminal 30 confirms the transaction and issues a receipt which validates the up-dated status of the Member's e-cash account.

b) A Member authorizes the transfer of an incremental amount of e-cash, typically, $10, $20, $30, . . . €20, €30, . . . , or £10, £20 from the Member's Club sponsored credit or debit financial card account using his mobile phone in a Near Field or other wireless connection to a computerized on-line kiosk 50 or other wireless gateway, identifying himself with his Membership Card 30. The Member is issued with a receipt which validates the up-dated status of the Member's e-cash account.

c) A Member authorizes the transfer of an incremental amount of e-cash, typically, $10, $20, $30, . . . €20, €30, . . . , or £10, £20 from the Member's Club sponsored credit or debit financial card account using his NFC equipped mobile phone in an SMS transaction, identifying himself with his Membership Card 30, typically in an NFC communication between the Membership Card and the mobile telephone. The Member is issued an SMS receipt which validates the up-dated status of the Member's e-cash account.

d) A Member purchases a Scratch-Card which vouchers an incremental amount of e-cash, typically, $10, $20, $30, . . . €20, €30, . . . , or £10, £20 value. The Member reveals the hidden number in the "voucher" Scratch-Card. The Member uses his Club sponsored mobile phone to send an SMS message which includes the voucher's hidden number to the Club's central computer apparatus. The Club computer system recognizes and validates the Member's cellular telephone; credits the Member's e-cash account and returns an SMS receipt. Typically, the Member destroys the Scratch Card to prevent future illicit use.

e) Trusted Club employees with wireless computerized terminals are authorized to accept and transfer all forms of acceptable discrete monetary value increments and to issue relevant printed receipts. Typically their areas of activity are close to safe repositories of value.

f) In the process of making a purchase at a Club authorized retail outlet, typically with a fixed data line network connection, a Member chooses to increment his e-cash account, typically to assure that after a purchase a reasonable balance will remain. Typically, a retail attendant at the network computerized terminals is authorized to accept and transfer all forms of acceptable discrete monetary value increments from. The attendant may use the Member's Membership Card to assure e-cash value is deposited in the proper Member's account. Typically, a receipt is issued which includes details of the purchase and the status of the e-cash account. Typically, the retail outlet is limited to executing discrete value increments to Club e-cash accounts. Typically, purchases are charged to a Club e-cash account subsequent to ascertaining that a sufficient balance exists in the account to cover the purchase.

g) When a Member settles his Membership privileges which typically include privileged access to Club events, he may choose to open or increment his e-cash account exercising any acceptable to the Club or any of the above methods of incrementing his e-cash account.

Any suitable method may be employed to increment temporary, Event Ticket identified, Club-provided e-cash accounts for Aways, for example:

a) An Away inserts an incremental amount of (physical) cash, e.g., $10, $20, $30, . . . €20, €30, . . . , or £10, £20, . . . in a computerized on-line Club authorized kiosk along with his valid Event Ticket, to increment a Club sponsored Event Ticket identified e-cash account for which the Away has purchased an Event Ticket. The kiosk terminal confirms the transaction and issues a receipt which validates the up-dated status of the Away's temporary Event Ticket identified e-cash account.

b) An Away authorizes the transfer of an incremental amount of e-cash, typically, $10, $20, $30, . . . €20, €30, . . . , or £10, £20, . . . from the Away's credit or debit financial card account using his mobile phone in a Near Field or other wireless connection to a computerized on-line kiosk or other wireless gateway, identifying himself with his Event Ticket. The Away receives an electronic receipt on his mobile phone which validates the up-dated status of the Away's e-cash Event Ticket identified account.

c) An Away purchases a Scratch-Card which vouchers an incremental amount of e-cash, typically, $10, $20, $30, . . . €20, €30, . . . or £10, £20 value. The Away learns the hidden number in the "voucher" Scratch-Card. The Away uses his mobile phone to send an SMS message which includes the hidden number to the Club's central computer apparatus. The Club computer system recognizes the validity of the Scratch Card number; credits the Away's e-cash account and returns an SMS receipt to the Away's mobile phone. The Away may be advised to destroy the Scratch Card to prevent future illicit use.

d) Trusted Club employees with wireless computerized terminals are authorized to accept and transfer all forms of acceptable discrete monetary value increments and to issue relevant receipts. Typically their areas of activity are close to safe repositories of value.

e) In the process of making a purchase at a Club authorized retail outlet, typically with a fixed data line network connection, an Away chooses to increment his e-cash account, typically to assure that after a purchase a reasonable balance will remain. Typically, a retail attendant at the network computerized terminals is authorized to accept and transfer all forms of acceptable discrete monetary value increments received from an Away. The attendant may use the Away's Event Ticket to assure value is deposited in the relevant Away's account. Typically, a receipt is issued which includes details of the purchase and the status of the e-cash account. Typically, the retail outlet is limited to executing discrete value increments to Club e-cash accounts. Typically, purchases are charged to a Club sponsored e-cash account subsequent to ascertaining that a sufficient balance exists in the account to cover the purchase.

The present invention may be employed in conjunction with a wide variety of methods for using e-cash such as but not limited to one, some or all of the following methods:

1) When the Member pays his yearly Membership and gets his card, the card may be allowed credit, in addition to the amount of transferred e-cash, to draw another "overdraft" amount at the first purchase of e-cash credit, without interest. The overdraft is paid at the next instance of transferring e-cash. For example, at the first deposit the Member deposits £10 (or £15). The Member is immediately able to buy, on Club premises, £15 (or £20) worth of merchandise or services, wherein any overdraft is deducted at the next e-cash replenishment. When next purchasing e-cash he again pays £10 or £15 and is then able to effect purchases for another £10 or £15, again taking advantage of the agreed upon overdraft. Printed receipts may record the amount of purchase and the e-cash balance.

2) The Member or Away can obtain a larger discount, typically benefiting from the standard overdraft allowance, if he deposits a larger amount. For example, a deposit of £100 allows him to purchase goods and services up to £115.

3) The Member or Away receives a small discount on all purchases credited to the e-cash account, e.g., 2%, and an additional discount for "specials", e.g., 30% on summer dress goods before Christmas.
4) Cash-back discounts on special sales may be made in cash at a refund counter or in the Club store.
5) Aways may be promised a variety of goods to empty their e-cash account upon leaving the premises such that the unused balance cannot exceed the price of a piece of merchandise exhibited by the Away's club. For example, an Away souvenir doll may be offered costing £0.5 and a comparable Club souvenir may be available at a vending machine which verifies each sale made using the Away's Event Ticket as identification.
6) An assortment of merchandise sponsored by the visiting club is offered for sale, partial proceeds of which are credited to the Away's club. This is an additional enticement to provide higher quality tickets, which may be used as souvenirs, e.g., "Prime Issue Tickets with Embossed Printing" to be collected in a Photo Album where the "Prime Issue Ticket" can be attached to the cover at the time of sale, or subsequently by the Away. The photo album and other souvenirs may be sold immediately following the event at a Club store wherein payment is typically made in any combination of e-cash or other acceptable tender, e.g., cash and coins to supplement the e-cash.
7) At the vendor stall, the Member may pay in cash, and get a receipt, in any increments of £10, e.g., £100, but cannot pay an exact amount, thereby to guarantee a small balance in the e-cash account. The Member obtains the 2% discount on the purchase, and leave the rest of the e-cash in his account.
8) E-cash may be stored both in a user's public key protected Membership Card and in the club computer and transactions may be made both on-line and off-line.
9) For a seasonal sum of e-cash deposits exceeding a defined amount, e.g., £50, either the accrued overdraft is forgiven (typically for overdrafts not larger than a maximum allowable ceiling), or the e-cash balance is subtracted from the following years' Membership fee or transferred with interest to the next season's Member's account.

Figure 7:
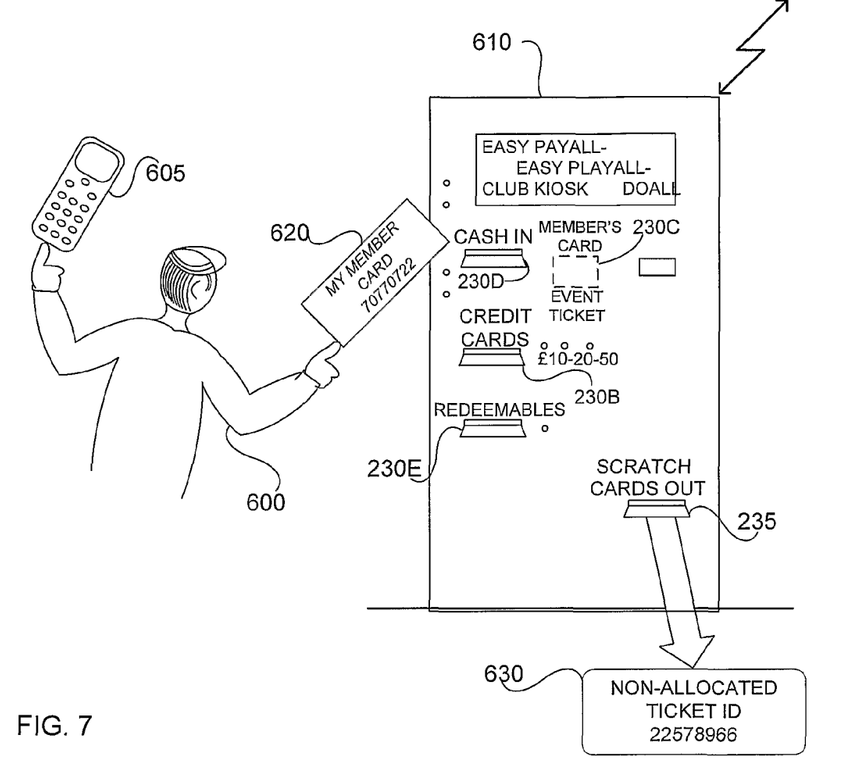
FIG. 7 is a simplified pictorial illustration of a club member or customer using a point of service constructed and operative in accordance with a preferred embodiment of the present invention, to load value into a membership card he bears on his person.
Figure 8A:
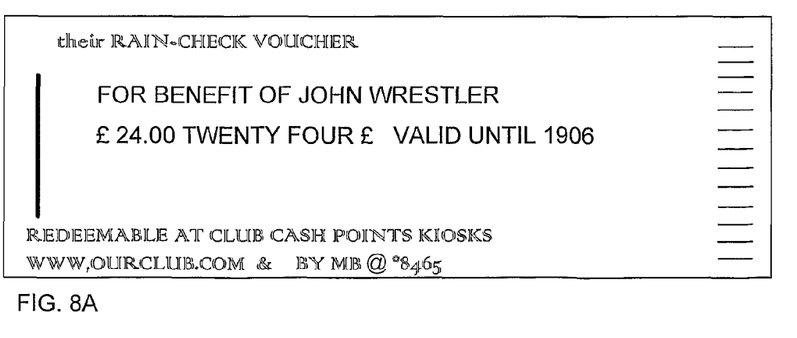
FIGS. 8A-8F are simplified pictorial illustrations of forms of value which are each loadable into a membership card, using the point of service of FIG. 7, in accordance with a preferred embodiment of the present invention.
Figure 8B:
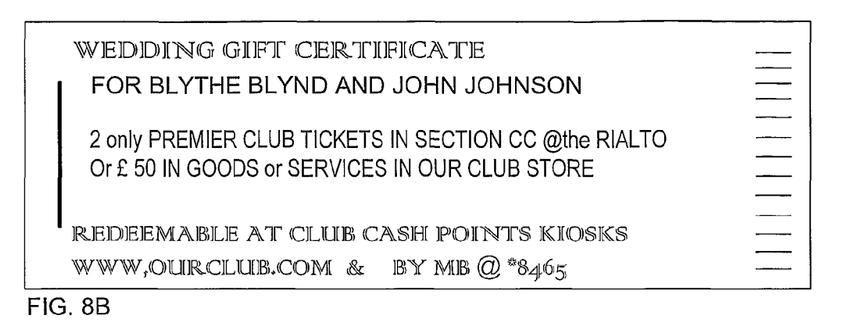
Figure 8C:
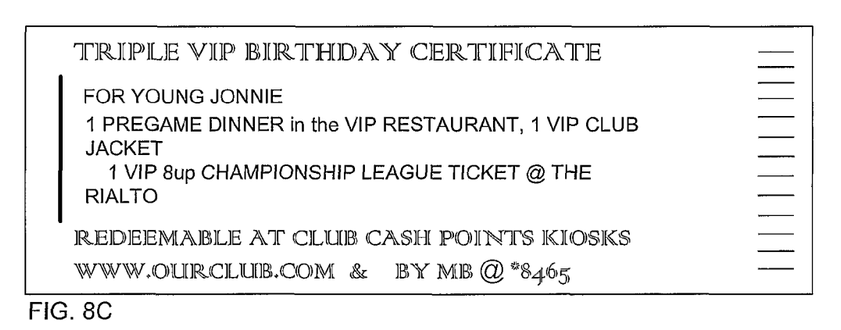
Figure 8D:
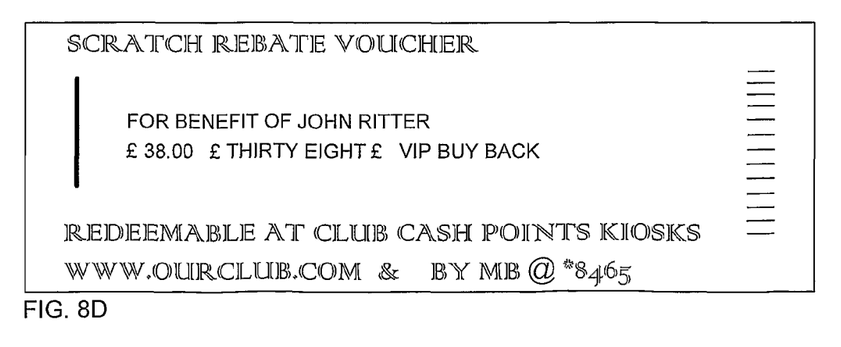
Figure 8E:
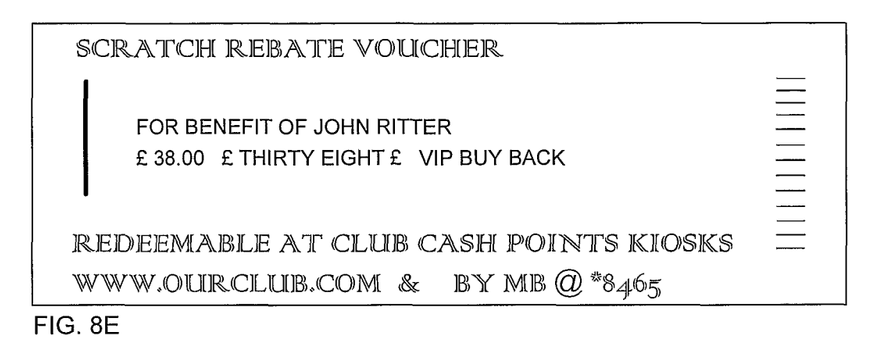
Figure 8F:
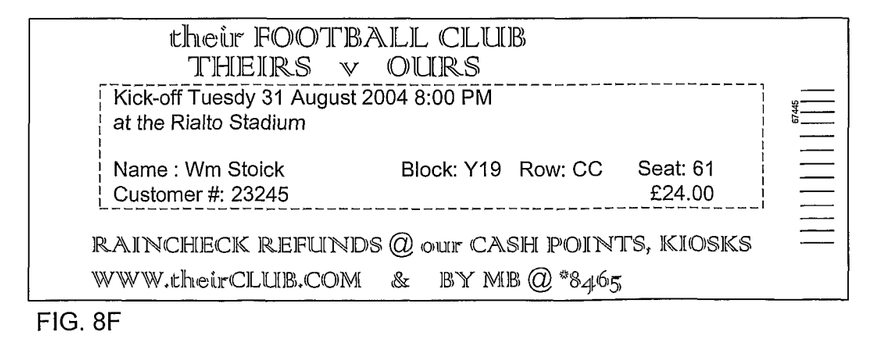

FIG. 7 is a simplified pictorial illustration of a club member or customer 600 using a computerized point of service 610 constructed and operative in accordance with a preferred embodiment of the present invention, to load value into a membership card 620 he bears on his person. This can be done either using a credit card or by providing cash or by providing redeemables such as but not limited to coupons, gift vouchers, and rebate certificates as illustrated in detail by way of example in FIGS. 8A-8F. The club member 600 typically receives a substrate e.g. scratch card with a number printed thereon to punch into his telephone 605 and send e.g. as an SMS or via the Internet to an on-line center such as the center 520 of FIG. 6.

The point of service 610 of FIG. 7 is optionally completely off-line so as to reduce the length of time required for point of sale-customer interaction. In this embodiment, the value purchased is actually loaded into the member's card only by the center receiving the SMS or Internet message. Alternatively, the point of sale is on-line and the point of sale identifies the member 600 by means of the ID on the member's card 620 and updates the member's balance immediately upon completion of the ecash loading transaction.

According to a preferred embodiment of the present invention, instead of using the point of sale 610 of FIG. 7 to load his card, the member may use the point of sale to purchase a unique (i.e. ID bearing) non-allocated ticket 630 for an unspecified seat at an unspecified game. Subsequently, the member 600 may contact a telephone or Internet accessible center, identify the unique ticket 630 by presenting the ID on the ticket, and be allocated a game and a seat thereat.

FIGS. 8A-8F are simplified pictorial examples of forms of value which are each loadable into a membership card, using the point of service 610 of FIG. 7.

According to one embodiment of the invention, the system may comprise one or more computers or other programmable devices, preferably equipped with input devices such as a keyboard and mouse operative to allow users to provide input to the system as described herein, and output devices such as a printer or interface with communication network servers such as Internet servers or with communication devices such as a cellular telephone. Each computer may be programmed in accordance with some or all of the apparatus, methods, features and functionalities shown and described herein. Alternatively or in addition, the apparatus of the present invention may comprise a memory which is readable by a machine and which contains, stores or otherwise embodies a program of instructions which, when executed by the machine, comprises an implementation of some or all of the apparatus, methods, features and functionalities shown and described herein. Alternatively or in addition, the apparatus of the present invention may comprise a computer program implementing some or all of the apparatus, methods, features and functionalities shown and described herein and being readable by a computer for performing some or all of the methods of, and/or implementing some or all of the systems of, embodiments of the invention as described herein.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A system for facilitating a sequence of events, each event comprising a multiplicity of purchases made by a large, a priori known population, specific to that event, during a short, a priori known time interval at a known site, the population specific to an individual event comprising a multiplicity of a priori known users, the system comprising:
an on-site event attendee data bank recording an ID and a pre-paid balance value for each individual user within the multiplicity of known users expected to attend an individual event;
a data bank loader operative to set up for each individual event by loading into the event attendee data bank, IDs and pre-paid balance values, for users expected to attend said individual event;
a multiplicity of portable receptacles issued to the multiplicity of known users respectively, at least one individual receptacle storing a user ID and a pre-paid balance value for a corresponding individual one of the known users;

a first plurality of e-cash filling stations incrementing the pre-paid balance values of individual users in the on-site data bank, to reflect pre-payments made thereby; and a second plurality of mobile service provider workstations operative to read individual ones of said multiplicity of portable receptacles, to access the on-site data bank according to the user ID of each individual portable receptacle, to enter into a transaction having a value with an individual user if the user's pre-paid balance value accessed from the on-site data bank is positive, and to decrement the transaction's value from the individual user's pre-paid balance value in the on-site data bank.

2. A system according to claim 1 wherein at least some of the first plurality of e-cash filling stations are located at the site.

3. A system according to claim 1 and wherein at least some of the e-cash filling stations are also operative to accept payment for entry to the site.

4. A system according to claim 1 wherein said data bank loader comprises an ID and balance value data transfer interface operative to transmit the pre-paid balance value for each individual user within at least a subset of the known population of users to the data bank of a corresponding system at another site.

5. A system according to claim 4 wherein the site comprises a sports arena and wherein the data bank comprises a first section for home team data and a second section for away team data and wherein the balance data transfer interface is operative to transfer IDs and pre-paid balance values from said first section to corresponding systems before away games and to receive IDs and pre-paid balance values from corresponding systems and store these in the second section, before home games.

6. A system according to claim 1 wherein said workstations comprise wireless workstations having a wireless data connection to the on-site data bank.

7. A system according to claim 1 wherein said multiplicity of portable receptacles comprises:
a multiplicity of membership cards borne by the multiplicity of consumers, and at least some of said multiplicity of membership cards includes a pre-paid payment scheme; and
wherein said system also comprises a membership managing functionality for interacting with said multiplicity of membership cards including functionality for managing said pre-paid payment scheme.

8. A system according to claim 7 wherein each individual membership card comprises an electronic chip.

9. A system according to claim 1, the system also comprising:
a multiplicity of vouchers each bearing a unique voucher ID; and
a plurality of communication devices each including an interface for receiving said voucher IDs, the plurality of communication devices being respectively associated with a plurality of electronic accounts;
and wherein said multiplicity of portable receptacles includes a plurality of membership cards associated with the plurality of electronic accounts respectively; and
a voucher management functionality operative to store a plurality of account balances corresponding to said plurality of electronic accounts, to receive a voucher ID from an individual one of said plurality of communication devices, to decrement a corresponding one of said accounts to reflect sale information; and to provide account balance information upon presentation of a relevant membership card.

10. A system according to claim 9 wherein at least some of said communication devices comprise mobile communication devices.

11. A system according to claim 9 wherein at least some of said communication devices comprise wireless communication devices.

12. A system according to claim 9 wherein at least some of said communication devices comprise cellular communication devices.

13. A system according to claim 9 wherein at least some of said communication devices comprise SMS transmitting devices.

14. A system according to claim 9 wherein at least some of said communication devices communicate via the Internet.

15. A system according to claim 9 wherein at least some of said communication devices communicate via a WAN.

16. A system according to claim 9 wherein said ID-bearing vouchers comprise vouchers each having a human-sensible ID.

17. A system according to claim 16 wherein said human-sensible ID comprises a human-readable ID.

18. A system according to claim 1 and also comprising an alert generator operative to query the data bank re users having an unused balance exceeding a specific value and to generate an alert, informing said users that a special service is now being offered at the specific value.

19. A computer-controlled process for facilitating a sequence of events, each event comprising a multiplicity of purchases made by a large, a priori known population, specific to that event, during a short, a priori known time interval at a known site, the population specific to an individual event comprising a multiplicity of a priori known users, the system comprising:
at an on-site event attendee data bank, recording an ID and a pre-paid balance value for each individual user within the multiplicity of known users expected to attend an individual event;
setting up for each individual event by loading into the event attendee data bank, IDs and pre-paid balance values, for users expected to attend said individual event;
issuing a multiplicity of portable receptacles to the multiplicity of known users respectively, at least one individual receptacle storing a user ID and a pre-paid balance value for a corresponding individual one of the known users;
using, by an automated programmed computer, a first plurality of e-cash filling stations to increment the pre-paid balance values of individual users in the on-site data bank, to reflect pre-payments made thereby; and
at a second plurality of mobile service provider workstations operative to read individual ones of said multiplicity of portable receptacles, accessing, by an automated programmed computer, the on-site data bank according to the user ID of each individual portable receptacle, to enter into a transaction having a value with an individual user if the user's pre-paid balance value accessed from the on-site data bank is positive, and to decrement the transaction's value from the individual user's pre-paid balance value in the on-site data bank.

20. A process according to claim 19 wherein said setting up includes transmitting balance value information, off line, between events, specifically regarding a population of users which has been served by a first system at the known site and is expected to be served by a second system at a second site and not transmitting balance value information regarding users which are not expected to be served by the second system at the second site.

21. A process according to claim 20 wherein said setting up includes loading, preparatory to an anticipated match at the second site, balance value data regarding fans of a first, "away" team expected at the second site for the match, which data is up to date, up until and including the match preceding the anticipated match at the second site, into a purchase facilitation system at the second site.

22. A process according to claim 21 wherein balance value data regarding fans which are not expected at the second site for the match are not loaded into the purchase facilitation system at the second site preparatory to the anticipated match at the second site.

* * * * *

UNITED STATES PATENT AND TRADEMARK OFFICE
CERTIFICATE OF CORRECTION

PATENT NO. : 8,504,395 B2  Page 1 of 1
APPLICATION NO. : 12/161833
DATED : August 6, 2013
INVENTOR(S) : Vago et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this
Fifteenth Day of September, 2015

Michelle K. Lee
*Director of the United States Patent and Trademark Office*